United States Patent [19]
Satoh et al.

[11] Patent Number: 5,422,194
[45] Date of Patent: Jun. 6, 1995

[54] LIGHT-RESISTANT POLYANILINE LIGHT-SHIELDING FILM AND LIQUID CRYSTAL DISPLAY DEVICE USING THE SAME

[75] Inventors: Masaharu Satoh; Hitoshi Ishikawa; Kosuke Amano; Setsuo Kaneko; Yoshihiro Hirai, all of Tokyo, Japan

[73] Assignee: NEC Corporation, Tokyo, Japan

[21] Appl. No.: 234,837

[22] Filed: Apr. 28, 1994

[30] Foreign Application Priority Data

May 13, 1993 [JP] Japan .................................. 5-134087
Dec. 14, 1993 [JP] Japan .................................. 5-313324

[51] Int. Cl.$^6$ ............................................. B32B 27/18
[52] U.S. Cl. ...................................... 428/704; 528/422; 252/500; 252/512; 252/518; 428/1
[58] Field of Search ................ 528/422; 252/500, 512, 252/518; 428/1, 704

[56] References Cited

U.S. PATENT DOCUMENTS

| | | | |
|---|---|---|---|
| 4,806,271 | 2/1989 | Yaniger et al. | 252/500 |
| 5,205,965 | 4/1993 | Uetani et al. | 252/500 |
| 5,240,644 | 8/1993 | Barry, Jr. et al. | 252/500 |
| 5,254,552 | 11/1993 | Abe et al. | 528/422 |

*Primary Examiner*—Melvyn I. Marquis
*Assistant Examiner*—Margaret W. Glass
*Attorney, Agent, or Firm*—Young & Thompson

[57] ABSTRACT

A light-resistant polyaniline light-shielding film, comprising a thin polyaniline film in which Lewis acid is contained in an amount of 0.1 to 5 mol % per monomer unit of the polyaniline. The thin film is used as a black matrix for a liquid crystal display device. The device thus obtained has high reliability.

11 Claims, 2 Drawing Sheets

LIGHT-RESISTANT POLYANILINE LIGHT-SHIELDING FILM AND LIQUID CRYSTAL DISPLAY DEVICE USING THE SAME

BACKGROUND OF THE INVENTION

1. Field of the Invention

The present invention relates to a light-shielding or light-shutting polyaniline film and a liquid crystal display device using the same, and in particular to a light-resistant polyaniline light-shielding or light-shutting film which is suitably used as a light-shielding film in various display devices or light shutters and a liquid crystal display device using the same.

2. Disclosure of the Related Art

With regard to light-shielding materials for use in display devices, in the past, polyaniline obtained by oxidative polymerization of aniline has been examined in the form of powder, a solution, a thin film or the like. It has been anticipated that among these forms, the thin film can be utilized as a light-shielding material for use in displays and light shutters because of change in color of polyaniline depending on oxidation-reduction states. Unexamined Japanese Patent Publications Sho 61-238028 and 62-80631 teach electrochromic elements in which electroconductive polymers such as polyaniline or the like are used as a material having electrochromic function. These publications, however, do not describe the use of polyaniline as a light-shielding film and improvement in light resistance which is required in using the polyaniline as the light-shielding film. As for methods of forming the thin film of polyaniline, in the past, there have been known electrochemically anodizing polymerization of aniline, a method of polymerizing aniline in the presence of an oxidizing agent such as ammonium peroxodisulfate, dedoping the oxidizing agent, forming a solution of polyaniline and casting the solution, and a method of casting a solution containing as a dopant a bulky Lewis acid compound such as dodecylbenzene sulfonic acid or the like.

On the other hand, in association with an advance in a large size display and display capacity of the liquid crystal display devices (in some cases, hereinafter referred to as "LCD"), active matrix LCD's and simple matrix LCD's in which a super twisted nematic (in some cases, hereinafter referred to as "STN") mode was used have been developed and have been applied to various word processors and general purpose computers such as personal computers. In the simple matrix LCD, a striped transparent electrode made of indium tin oxide (hereinafter referred to as "ITO") or the like is formed on each transparent substrate in such a way that the striped transparent electrodes overlap each other crosswise. In order to realize higher contrast and high-speed response in the liquid crystal display device, the active matrix LCD, in which a semiconductor element having a switching function is set on a pixel electrode which is placed corresponding to each pixel in the LCD, has been recently applied to, for instance, a personal computer of a color notebook type or the like. In this semiconductor element, there is used a thin film transistor (TFT) or thin film diode (TFD). As for the pixel electrode, there is ordinarily used the above ITO. These materials are described in detail in "HANDBOOK OF LIQUID CRYSTAL DEVICE" published by Daily Industrial Newspaper (1989), p. 416, the disclosure of which is hereby incorporated by reference herein.

In the above-mentioned liquid crystal display devices, display is performed with transmitted light from back light in order to improve visibility required in the art. In particular, the back light is required to correspond to the color display. In this case, a portion of controlling the light (a light-controlling portion) corresponds to a crossed portion of the transparent electrodes in the simple matrix LCD and to the pixel electrodes in the active matrix LCD. Spacing or gap is given between the light-controlling portions and the transmitting light cannot be controlled at the spacing, and thus reduction in contrast occurs.

Thus, in order to obtain high contrast in the art, a light-shielding portion referred to as a black matrix is set on the spacing given between the light-controlling portions to thereby improve the contrast. Particularly, in color displays, the black matrix is set ordinarily on a substrate of a color filter. A material for the black matrix includes, for instance, ordinarily a metal material, such as chromium, aluminumn or the like, or resin in which carbon black is dispersed.

The black matrix in the active matrix LCD is formed on a substrate (an opposite or facing substrate) opposite to a substrate (an element substrate), on which the semiconductor element is formed, in such a way that it prevents the light from leaking or escaping out of portions other than the liquid crystal display portion, including the semiconductor element. In the active matrix LCD, the black matrix is formed on the opposite substrate as mentioned above. However, it was difficult to attain a high ratio of openings for the following reasons.

(1) The accuracy of adjustment of the element substrate to the opposite substrate was inaccurate to several micrometers or more.

(2) The element substrate is exposed to the light ordinarily with a stepper type light exposure machine, and the accuracy of adjustment between the steppers in some cases deviates several micrometers due to a state of the surface of the substrate.

(3) The element substrate contracts because of the exposure of the substrate to a temperature of the order of 300° C. in the course of the process.

For the above-mentioned reasons, it is necessary to widen a width of the black matrix and increase the margin of the above adjustment as the transparent substrate increases in size. Thus, the ratio of openings is reduced. The reduction in the opening ratio leads to reduction in utilization of the back light and thus reduction in brightness and increase in power consumption are caused.

In order to resolve the above problems, it has been proposed that a light-shielding portion is set on the side of the element substrate as taught in Unexamined Japanese Patent Publication Nos. 54-150097 and 60-68325, the disclosure of which is hereby incorporated by reference herein. However, materials for shielding the light as illustrated in these publications include metals or resin in which carbon black is dispersed. The following problem exists in the use of these materials. Namely, if the black matrix made of the metal is disposed on the element substrate, a lateral electric field is generated between the pixel electrode and the metallic black matrix and disclination or the like is caused, and the light leakage is caused. As a result, the light-shielding effect is not attained. In addition, if the resin with carbon black dispersed therein is used as the black matrix, satisfactory light-shielding properties can be obtained merely by a thick resin film (in other words, the satisfactory properties cannot be obtained by a thinner resin film) but if the thick film is used, it is difficult to control the distance between the two facing substrates.

The polyaniline has extended molecular structure with conjugation sequences and thus absorbs the light energy. However, the conjugation becomes unstable as the light energy is absorbed. Thus, if the polyaniline is used in the displays and light shutters for a long period, change in the molecular structure, which is considered to be depending on the reaction such as decomposition of the polymer, addition of low-molecular substances or the like, is appeared therein and the performance thereof deteriorated as the change increases.

In addition, in the conventional liquid crystal display devices, the good contrast and high ratio of openings could not exist together.

SUMMARY OF THE INVENTION

Accordingly, an object of the present invention is to overcome some problems in the above-mentioned prior art and thus to provide a light-shielding polyaniline film polyaniline having excellent light resistance.

Another object of the present invention is to provide a liquid crystal display device in which good contrast and high opening ratio coexist.

According to one aspect of the present invention, there is provided a light-resistant polyaniline light-shielding film, comprising a thin polyaniline film in which Lewis acid is contained in an amount of 0.1 to 5 mol % per monomer unit of the polyaniline.

According to another aspect of the present invention, there is provided a liquid crystal display device, comprising two transparent substrates each having at least a plurality of transparent electrodes and a liquid crystal material, the liquid crystal material being sandwiched between the transparent substrates, and a part of at least one transparent substrate of the transparent substrates being covered by the light-resistant polyaniline light-shielding film.

The light-shielding polyaniline film of the present invention is essentially different from the conventional polyaniline as a light-shutting material for use in an electrochromic element and fulfills the intended function opposite to that of the conventional electrochromic material having poor change in color and light-transmission. It has been found that the polyaniline can absorb the Lewis acid of up to 100 mol % or more per repeating unit of the polymer by doping treatment. In other words, the Lewis acid is incorporated in the polyaniline. The application of this polyaniline to the electrochromic material is based on differences in concentration of Lewis acid (i.e. dopant) which follows change in color. The change is controlled generally by an electrochemical oxidation-reduction reaction of polyaniline in an electrolyte. For this reason, in the conventional electrochromic element, polyaniline always comes in contact with the electrolyte and thus the content of Lewis acid in the film does not fall to 5 mol % or less per monomer unit of polymer. The concentration of acid as defined in the prior art corresponds to that of acid as the electrolyte when aniline is electrolytically polymerized or that of acid required in working the polymer as the electrochromic element but is not the concentration of acid contained in the film. In the prior art, if the concentration of Lewis acid in the film is fixed, the display device does not fulfill the intended function.

Aniline derivatives for use in the present invention are compounds obtained by oxidatively reacting aniline as a raw material and include, for instance, phenylquinone diimine, emeraldine, indamine or the like. The light-resistant polyaniline light-shielding film is formed by oxidatively polymerizing the above-mentioned aniline or aniline derivatives in the presence of an oxidizing agent under acidic conditions. The oxidizing agent is not particularly restricted and includes publicly-known oxidizing agents which can be used in the polymerization of aniline, for instance, potassium dichromate, sodium dichromate, ammonium dichromate, benzoquinone, hydrogen peroxide, sodium peroxodisulfate, ammonium peroxodisulfate or the like. Among these oxidizing agents, potassium dichromate, sodium dichromate, ammonium dichromate, benzoquinone, hydrogen peroxide and ammonium peroxodisulfate are preferred for the purpose of obtaining a thin polyaniline film having low content of Lewis acid compound anion.

The Lewis acid compound for use in the present invention is a common electron acceptor and includes, for instance, compounds derived from protonic acids which were used in the polymerization of aniline, compounds produced by reduction of the oxidizing agent in the course of oxidation reaction, compounds intentionally introduced as a dopant in after-treatment, or the like. In the present invention, the Lewis acid compound is not particularly restricted if the acid is the electron acceptor. Typically, the compound may include a halogen ion such as $Cl^-$, $Br^-$, $I^-$ or the like; a sulfate ion such as $HSO_4^-$, $R-SO_4^-$ (wherein R represents a $C_1-C_{12}$ alkyl group, such as methyl, ethyl, propyl, butyl, pentyl, hexyl, heptyl, octyl, nonyl, decanyl, undecanyl and dodecanyl, and a $C_2-C_{22}$ alkenyl group, e.g. oleyl and stearyl) or the like; an aromatic sulfonate anion such as benzenesulfonate anion, p-toluenesulfonate anion, nephthalenesulfonate anion, dodecyl benzenesulfonate anion or the like; and an anion such as $HNO_3^-$, $H_2PO_4^-$, $CH_3COO^-$ or the like.

The polyaniline which was synthesized by the oxidative polymerization contains the Lewis acid compound arising from the oxidizing agent or protonic acid which is used in polymerizing aniline. The Lewis acid compound having high dissociation constant functions as the dopant and as a result conductive polyaniline is formed. After the polyaniline was synthesized, the dopant therein is neutralized by alkali treatment to form an insulative compound. If the polyaniline is synthesized by using ammonium peroxodisulfate which is a typical oxidizing agent, the Lewis acid compound therein remains in the form of a salt even after electrical conductivity was lost by the neutralization treatment. The relation between the content and light-resistance of Lewis acid compound in the thin polyaniline film was in detail examined. As a result, it was found that if the Lewis acid compound is contained in higher concentration than 5 mol % per aniline unit of which the main chain of polyaniline is composed, the light-resistance of polyaniline is poor but properties of the polyaniline film containing the Lewis acid compound in concentration of 5 mol % or less do not change or are excellent. FIG. 1 shows the results of a test on light-resistance of a cast film of polyaniline which is obtained by synthesizing polyaniline in the presence of ammonium dichromate as the oxidizing agent, neutralizing the polyaniline in a large bulk of ammonia water, dissolving the polyaniline thus neutralized in N-methylpyrrolidone, adding hydrochloric acid thereto, and spreading the resulting solution on a plate to form the cast film. As seen from FIG. 1, after exposure of the cast film to light from a fluorescent tube for 100 hours, the light absorbance of the exposed film shows a bending point at around 5 mol % of chlorine content and decreases sharply in the chlorine content exceeding 5 mol %. Therefore, it is to be appreciated that if the content of Lewis acid compound in the polyaniline is of 5 mol % or less per repeating unit of the polymer, the cast film from the polymer shows no decrease in the light absorbance even after exposure to a fluorescent tube over 100 hours. The film attains an extremely excellent effect as compared with the film containing the Lewis acid compound exceeding 5 mol %.

On the other hand, absorption spectra of polyaniline change depending on an amount of the Lewis acid compound contained therein. FIG. 2 shows the absorption spectra of the polyaniline film (a film thickness of 1 μm) which is formed by the same method as mentioned above, before being subjected to the light-resistance test. As seen from FIG. 2, the polyaniline which does not contain the Lewis acid (0 mol % of the Lewis acid) has the low light transmission (%) over a great part of a visible light range but a wavelength region transmitting light is at around 415 nm. The cast film in which the Lewis acid of 0.1 mol % is incorporated or contained is excellent for the light-shielding film because the light transmission decreases even in a wavelength region near 415 nm and of 650 nm or more. In a range of 0.1 to 5 mol % of Lewis acid, the same absorption spectra as in 0.1 mol % of acid are measured.

A method of measuring the content of Lewis acid compound in the present invention is not particularly restricted and may include conventional methods, which are publicly known as an anion determination method, such as potentiometry and ion chromatography, or elemental analysis.

In the present invention, a method of forming the thin polyaniline film is not particularly restricted, and may include a conventional method of forming a thin film, for instance, a casting method or spin coating method. In addition, it is possible to polymerize aniline directly on the substrate and to wash the polyaniline thus obtained in situ. Furthermore, in the present invention, it is possible to pattern the thin polyaniline film as required. For instance, the patterning may be performed by patterning a solution of polyaniline with a printing process or by forming a resist layer on the thin film and then applying a lithography technique such as dry etching or the like.

The light-resistant polyaniline light-shielding film according to the present invention has the high light absorbance over a whole frequency region of visible light and further it is possible to make the film thin. Thus, the film can be used in the liquid crystal devices and various substrates in which the light-shielding properties are required.

In the active matric LCD using the film of the present invention, the whole or a part of the semiconductor element region and wiring region is covered by the light-resistant polyaniline light-shielding film. Thus, the positioning accuracy between the substrates as positioned in setting the light-shielding layer on the opposite substrate in not required, and even if the size of each substrate is larger, it is possible to prevent light leakage caused due to discrepancy between the substrates. In addition, the accuracy of size is improved because of forming of the light-shielding layer on the same substrate and thus it is possible to raise the opening ratio.

According to the present invention, the liquid crystal display device comprises the semiconductor element, pixel electrode and wiring which are formed on the transparent substrate of the active matrix LCD; and the light-resistant polyaniline light-shielding film which covers the semiconductor element and the wiring portion; and further the device may include at least one protective layer or insulating layer according to need. In the present invention, the region which is covered by the light-shielding layer comprising the light-resistant polyaniline is not particularly limited so far as at least a part of the semiconductor element and wiring is covered by the layer. According to need, it is possible to cover all the portion other than the pixel electrode or to cover only the semiconductor element portion.

In the present invention, the material and shape of the transparent substrate are not particularly restricted and it is possible to use the conventional materials which are publicly know in the art as the transparent substrate such as various glass, polymer films or the like. In addition, in the present invention, the material and construction of the wiring portion and semiconductor element and a method of producing them are not particularly restricted and it is possible to use the wiring and semiconductor element which are produced on the basis of the principle of forming of the wiring and semiconductor element in the art.

Furthermore, an element such as a capacitor, coil, resistance or the like can be attached to the semiconductor element.

The foregoing and other objects and features of the present invention will be apparent from the following description.

DETAILED DESCRIPTION OF THE PREFERRED EMBODIMENTS

The present invention will be hereinafter be described in more detail with reference to the non-limitating working examples given by way of illustration and the effects practically achieved by the present invention will be also discussed in more detail in comparison with control examples.

EXAMPLE 1

In this example, 1 mol of aniline was dissolved in an aqueous solution of p-toluenesulfonic acid (1 mol/l), and then an aqueous solution of ammonium dichromate as an oxidizing agent was added thereto dropwise in an amount of equal mol and stirred at 0° C. for 2 hours. Black polyaniline thus obtained was washed with a large bulk of ammonia water and collected by filtration.

Thereafter, the black polyaniline was dissolved in N-methylpyrrolidone and insoluble precipitates were removed by filtration to obtain a solution of polyaniline. Five of the polyaniline solutions, in which 0.1 mol %, 2 mol %, 3 mol %, 4 mol % and 5 mol % of hydrochloric acid per monomer unit of polyaniline were added, respectively, were prepared. Each of the solutions was spread on the surface of a glass plate and dried under reduced pressure at 150° C. to form a cast film.

Figure 2:
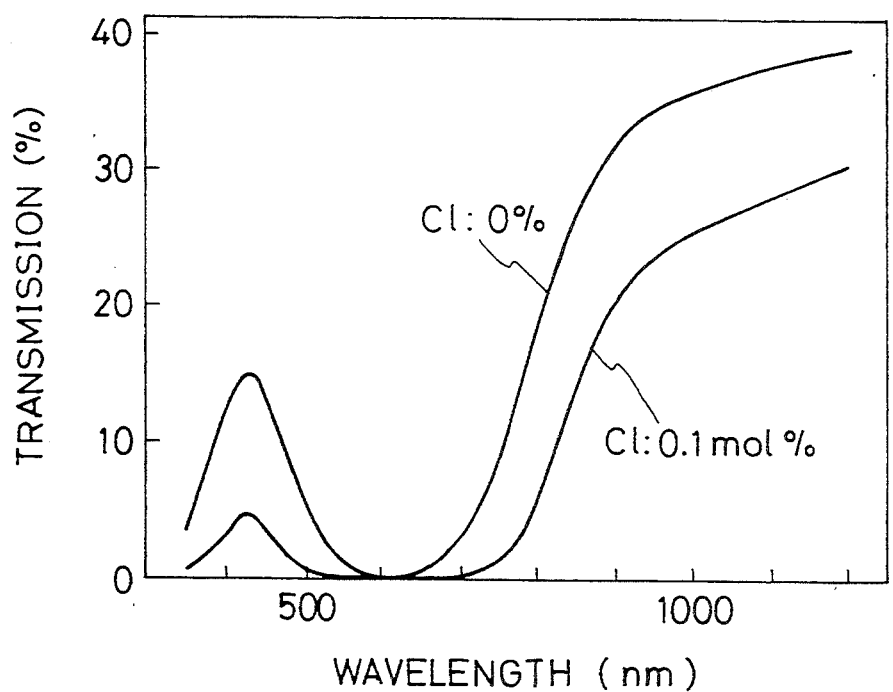
FIG. 2 shows absorption spectra of a light-shielding polyaniline film according to the present invention, before the films are subjected to the light-resistance test.

In these cast films, absorption spectrum of the film of polyaniline containing 0.1 mol % of hydrochloric acid was measured. As a result, the spectrum showed that the film had low light transmittance throughout visible light range. The result thus obtained is shown in FIG. 2, wherein wavelength (nm) is plotted in abscissa thereof and light transmittence (%) is plotted in ordinate thereof.

Figure 1:
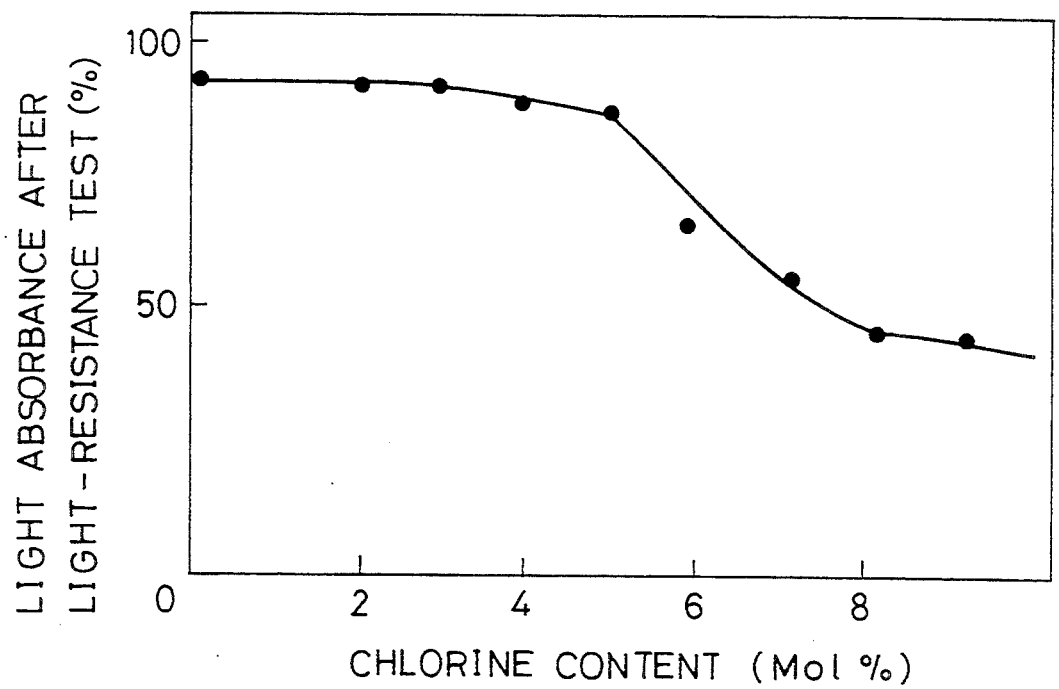
FIG. 1 is a graph showing the relation between light absorbance of a light-shielding polyaniline film of according to the present invention and chlorine content therein, after the film was subjected to a light-resistance test.

The above film was exposed to light from a fluorescent tube for 100 hours but the light absorbance did not almost change. Each of the other films was treated in the same manner as in the above film containing 0.1 mol % of hydrochloric acid. The results thus obtained are plotted in FIG. 1, wherein the chlorine content (mol %) of each film is plotted in abscissa thereof and light absorbance (%) of each film after was subjected to the light-resistance test is plotted in ordinate thereof.

CONTROL EXAMPLE 1

The same procedures as used in Example 1 were repeated except that amounts of hydrochloric acid to be added were replaced with 6 mol %, 7 mol %, 8 mol % and 9 mol % of hydrochloric acid per monomer unit of polyaniline. Thus, cast films were formed in the same manner as in Example 1.

The cast films were exposed to light from a fluorescent tube for 100 hours. The films after was subjected to light-resistance test showed heavily reduced light absorbance. The results thus obtained are plotted in FIG. 1, wherein the chlorine content (mol %) of each film is plotted in abscissa thereof and each light absorbance (%) is plotted in ordinate thereof as mentioned in Example 1.

CONTROL EXAMPLE 2

An N-methylpyrrolidone solution of polyaniline obtained in the same manner as in Example 1, in which hydrochloric acid was not added, was spread on the surface of a glass plate to form a non-chlorine cast film in the same manner as in Example 1. Absorption spectrum of the film was measured. The result is shown in FIG. 2. It can be seen from FIG. 2 that the film has high light transmittance at around 415 nm and 650 nm or more in the visible light region and thus the film functions insufficiently as a light-shielding film.

EXAMPLE 2

An N-methylpyrrolidone solution of polyaniline obtained in the same manner as in Example 1 was used to form a cast film of polyaniline in the same manner as in Example 1, except that hydrochloric acid was replaced with p-toluenesulfonic acid. The cast film thus obtained contained up to 5 mol % of p-toluenesulfonic acid per monomer unit.

This cast film was exposed to light from a fluorescent tube for 100 hours but the light absorbance did not almost change.

CONTROL EXAMPLE 3

An N-methylpyrrolidone solution of polyaniline obtained as in Example 1 was used to form a cast film of polyaniline in the same manner as in Control Example 1, except that hydrochloric acid in Control Example 1 was replaced with p-toluenesulfonic acid. The cast films thus obtained contained p-toluenesulfonic acid exceeding 5 mol % per monomer unit.

This cast film was exposed to light from a fluorescent tube for 100 hours and as a result the light absorbance extremely reduced.

CONTROL EXAMPLE 4

In this control example, 1 mol of aniline was dissolved in an aqueous solution of p-toluenesulfonic acid (1 mol/l), and then an aqueous solution of ammonium peroxodisulfate as an oxidizing agent was added thereto dropwise in an amount of equal mol and stirred at 0° C. for 2 hours. Black polyaniline thus obtained was washed with a large bulk of ammonia water and collected by filtration. Thereafter, the polyaniline thus collected was dissolved in N-methylpyrrolidone and insoluble precipitates were removed by filtration to obtain a solution of polyaniline. This polyaniline solution was spread on the surface of a glass plate and dried under reduced pressure at 150° C. to form a cast film. It was clear from the results of elemental analysis of this film that 6.5 mol % of sulfuric acid per monomer unit of polyaniline was contained therein.

This film was exposed to light from a fluorescent tube for 100 hours and as a result the light absorbance extremely reduced.

EXAMPLE 3

This example relates to a liquid crystal display device using the light-shielding film of the present invention.

Figure 3:
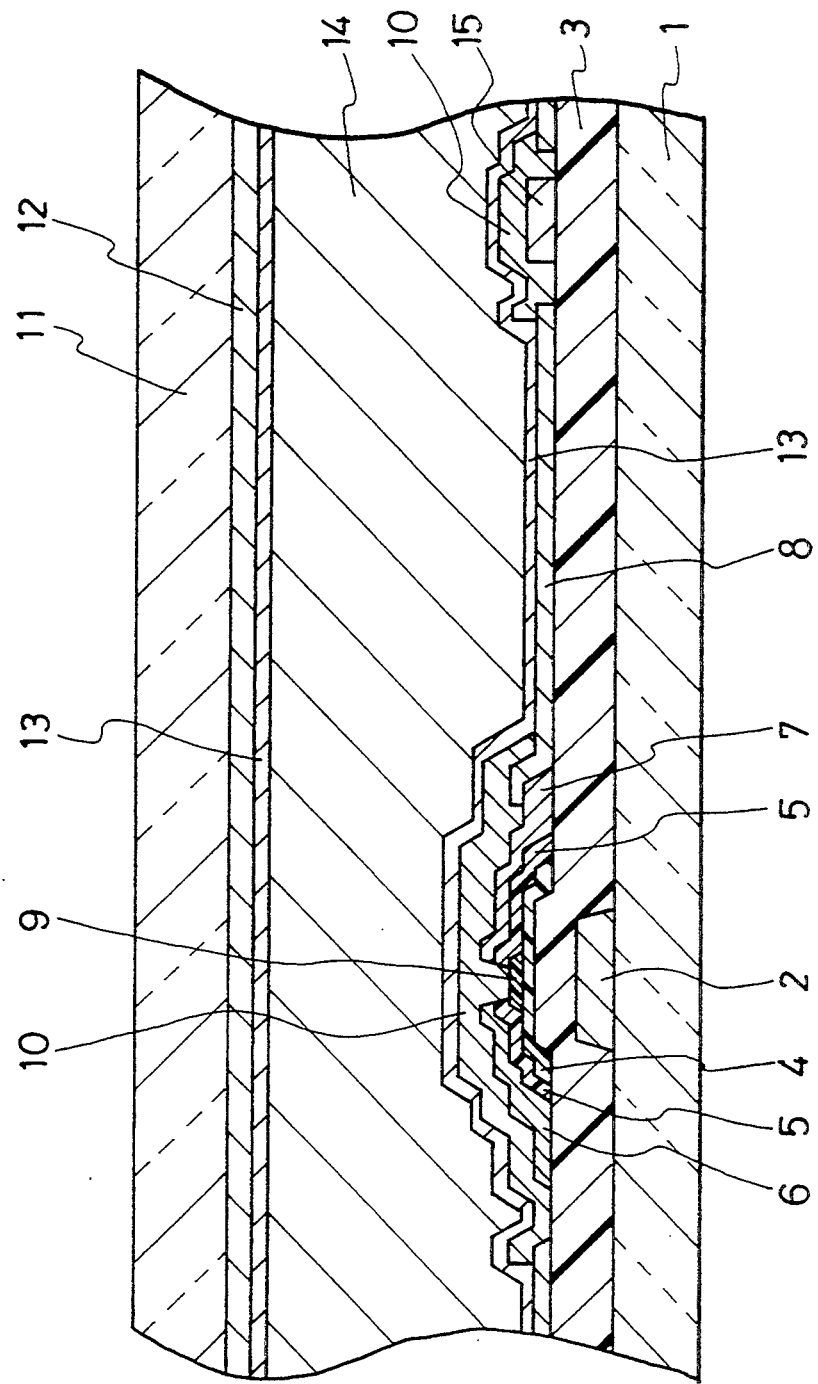
FIG. 3 shows a schematically and partially cross-sectional view of a liquid crystal display device according to the present invention.

Referring now to FIG. 3, there is shown a schematically and partially cross-sectional view of the liquid crystal display device according to the present invention. In the drawing, reference numbers denote the following elements:

| | |
|---|---|
| 1: GLASS SUBSTRATE | 2: GATE ELECTRODE |
| 3: GATE INSULATING FILM | 4: AMORPHOUS SILICON (a-Si) |
| 5: n-TYPE a-Si | 6: DRAIN ELECTRODE |
| 7: SOURCE ELECTRODE | 8: PIXEL ELECTRODE |
| 9: PROTECTIVE FILM | 10: BLACK THIN FILM |
| 11: GLASS SUBSTRATE ELECTRODE | 12: FACING OR OPPOSITE |
| 14: LIQUID CRYSTAL LAYER | 13: ORIENTED FILM |
| | 15: DRAIN or GATE WIRING |

As shown in FIG. 3, a thin film field effect transistor (TFT) was formed on the glass substrate 1 to obtain an element substrate. Namely, according to a conventional process, the gate electrode 2, the gate insulating film 3, the wiring 15, the amorphous silicon 4, the n+ amorphous silicon 5, the drain electrode 6, the source electrode 7 and the pixel electrode 8 were formed on the glass substrate 1 to give structure as shown in FIG. 3. Each of the gate electrode 2 and the source electrode 7 was electrically connected to driving circuits. As for a material for the pixel electrode 8 and the facing or opposite electrode 12, indium tin oxide (ITO) was used and as for a material for each of the gate, drain and source electrodes, chromium was used. The gate insulating film 3 and the protective film 9 were formed of silicon nitride. As for the above conventional process, there was used an ordinary process in forming the a-Si TFT.

A solution of 5 wt % polyaniline in N-methylpyrrolidone was applied onto the element substrate with the above TFT and dried at 120° C. under reduced pressure for 2 hours. The polyaniline solution was prepared by polymerizing an aniline monomer in the presence of ammonium peroxodisulfate as an oxidizing agent in an aqueous solution of nitric acid (mol equal to the aniline monomer), adding an ammonia water thereto for neutralization, washing the neutralized solution with water and acetone, and then dissolving the resulting solution in N-methylpyrrolidone to obtain a polyaniline solution. A film having electrical conductivity of $1.8 \times 10^{-10}$ S/cm was formed of the above polyaniline solution. The polyaniline layer was patterned according to dry etching, in which difference in a film thickness between a resist film and the polyaniline layer is utilized, to thus obtain the black thin film 10 as shown in FIG. 3. The black thin film 10 was formed in such a way that the portion of the pixel electrode which was 3 μm or more from the peripheral edge inwards was open, i.e. was not covered by the film (i.e. an opening) and the remaining portion, i.e. the peripheral edge (a width less than 3 μm) was covered by the film. Namely, the black thin film was formed in such a way that it covers the TFT, the wirings, the peripheral portion of the pixel electrode and spacing between these parts. Then, the oriented film 13 was formed on the element substrate.

Separately, there was made an opposite substrate comprising the glass substrate 11 and the facing or opposite electrode 12 and another oriented film 13 which wee stacked in order on the glass substrate 11.

Then, a twisted nematic (TN) liquid crystal material was sandwiched between the element substrate on which the oriented film 13 was formed and the above opposite sustrate in such a way that it came in contact with and was bonded to each of the oriented films of the element substrate and the opposite substrate, to thereby fabricate an active matrix LCD. As for the oriented film 13, there was used polyimide. Rubbing was performed perpendicular to each other.

Structure of the active matrix LCD thus obtained was such that the black thin film of polyaniline was stacked on the substrate, a thickness of the polyaniline layer being 0.5 μm. This polyaniline layer had low light transmission of 5% or less in a wavelength range of 400 nm to 700 nm and the light was sufficiently shielded or shut by the polyaniline layer. Thus, contrast of 150 or more was attained.

In this example, pitch of the pixel was of the order of 100 μm, and thus there was obtained a high density panel and a ratio of opening was as high as 50%. In a conventional structure that a black matrix was arranged on a facing substrate, the opening ratio is of the order of 25%. Therefore, the present invention made the opening ratio double as mentioned above. In the liquid crystal display device of the present invention, bad operation due to forming of the polyaniline layer was not observed.

In the present invention, the black thin film is not limited to the polyaniline used in this example and of course it is possible to use as the black thin film 10 all the light-resistant polyaniline light-shielding films as recited herein.

This example relates to the monochromatic panel but it was confirmed that a color panel in which a color filter was arranged on the facing substrate attained the same effect as in the monochromatic panel. In addition, it was confirmed that it was possible to apply the light-shielding film in this example to light valves of not only a direct viewing type but also a projection type and that there was attained the same effect in the both types.

As discussed above, according to the present invention, there are provided the light-resistant polyaniline light-shielding film having light-shielding properties with high reliability and the liquid crystal display devices, and the effect of the light-shielding film is surprisingly effective as compared with the prior art.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A light-resistant polyaniline light-shielding film, comprising a film of polyaniline, said light-shielding film a Lewis acid compound in an amount of 0.1 to 5 mol % per monomer unit of said polyaniline.

2. The light-resistant polyaniline light-shielding film as defined in claim 1, wherein said polyaniline is obtained by oxidative polymerization of aniline or an aniline derivative selected from the group consisting of phenylquinone diimine, emeraldine and indamine in the presence of an oxidizing agent.

3. The light-resistant polyaniline light-shielding film as defined in claim 2, wherein said oxidizing agent is a compound selected from the group consisting of potassium dichromate, sodium dichromate, ammonium dichromate, benzoquinone, hydrogen peroxide, sodium peroxodisulfate and ammonium peroxodisulfate.

4. The light-resistant polyaniline light-shielding film as defined in claim 2, wherein said oxidizing agent is a compound selected from the group consisting of potassium dichromate, sodium dichromate, ammonium dichromate, benzoquinone, hydrogen peroxide and ammonium peroxodisulfate.

5. The light-resistant polyaniline light-shielding film as defined in claim 2, wherein said oxidizing agent is selected from ammonium dichromate or ammonium peroxodisulfate.

6. The light-resistant polyaniline light-shielding film as defined in claim 1, wherein a Lewis acid compound a member selected from the group consisting of a halogen ion, a sulfate ion, an aromatic sulfonate anion, $HSO_3^-$, $H_2PO_4^-$ and $CH_3COO^-$.

7. The light-resistant polyaniline light-shielding film as defined in claim 6, wherein said halogen ion is an ion selected from the group consisting of $Cl^-$, $Br^-$ and $I^-$.

8. The light-resistant polyaniline light-shielding film as defined in claim 6, wherein said sulfate ion is an ion selected from the group consisting of $HSO_4^-$ and $R-SO_4^-$ wherein R represents an alkyl group or an alkenyl group.

9. The light-resistant polyaniline light-shielding film as defined in claim 6, wherein said aromatic sulfate anion is an ion selected from the group consisting of benzenesulfonate anion, p-toluenesulfonate anion, naphthalenesulfonate anion and dodecyl benzenesulfonate anion.

10. The light-resistant polyaniline light-shielding film as defined in claim 6, wherein said halogen ion is $Cl^-$.

11. The light-resistant polyaniline light-shielding film as defined in claim 6, wherein said aromatic sulfonate anion is p-toluenesulfonate anion.

* * * * *

UNITED STATES PATENT AND TRADEMARK OFFICE
CERTIFICATE OF CORRECTION

PATENT NO. : 5,422,194
DATED : June 6, 1995
INVENTOR(S) : Masaharu SATOH et al.

It is certified that error appears in the above—identified patent and that said Letters Patent is hereby corrected as shown below:

On the title page, in Item 75, change the name of the fifth inventor, from "Yoshihiro Hirai" to --Yoshihiko Hirai--.

Signed and Sealed this

Nineteenth Day of September, 1995

Attest:

BRUCE LEHMAN

*Attesting Officer*   *Commissioner of Patents and Trademarks*